Feb. 24, 1970     W. H. SMYERS, JR     3,497,179
VALVE
Filed March 10, 1967     2 Sheets-Sheet 1
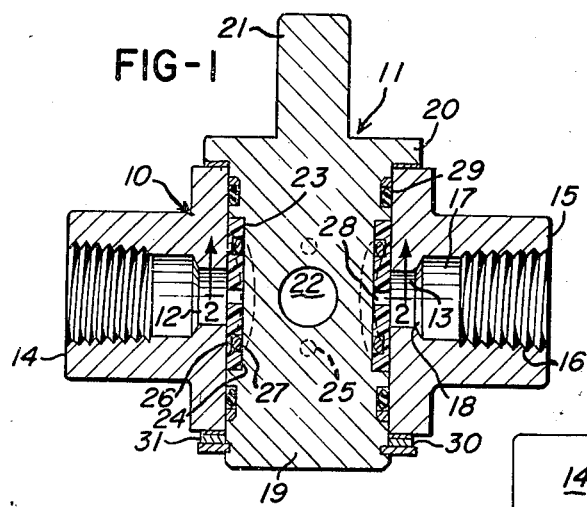
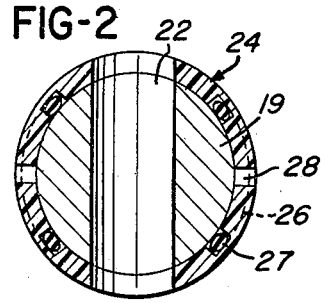
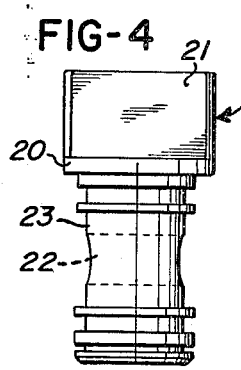
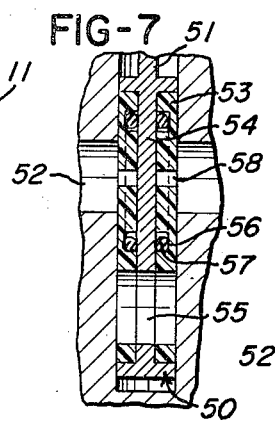
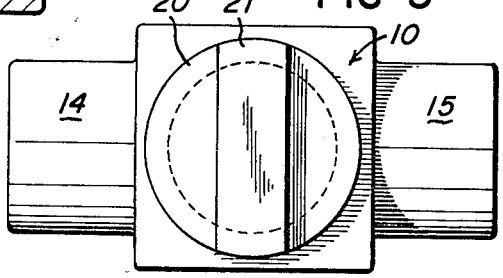
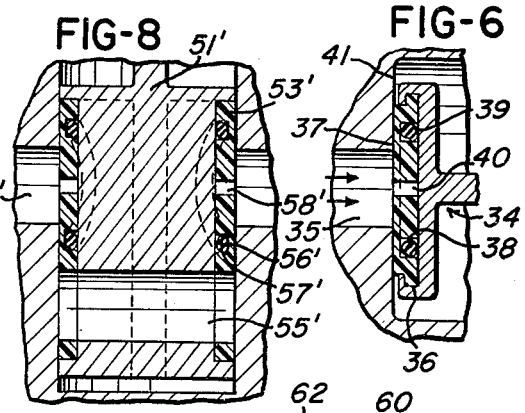
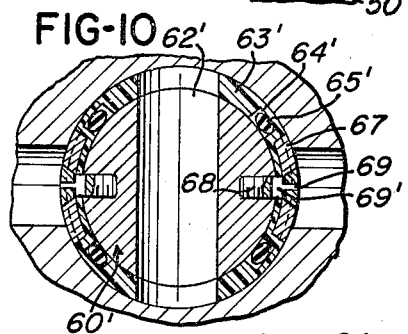
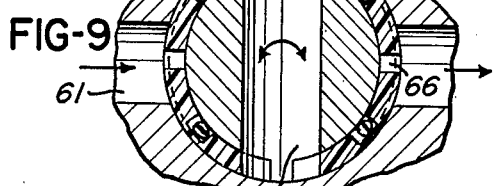
INVENTOR
WILLIAM H. SMYERS, JR.
BY Jerome P. Bloom
ATTORNEY Feb. 24, 1970  W. H. SMYERS, JR  3,497,179
VALVE
Filed March 10, 1967  2 Sheets-Sheet 2
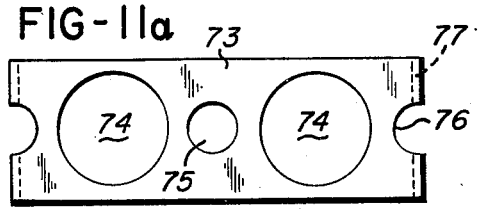
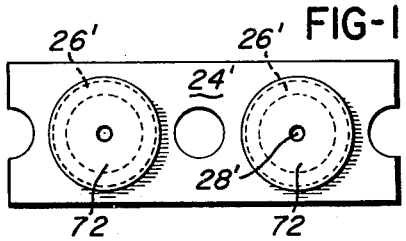
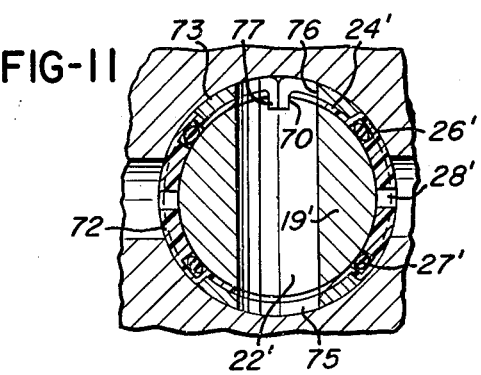
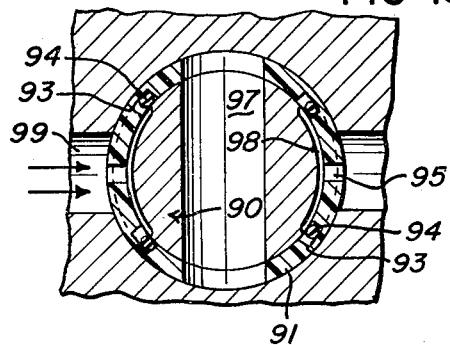
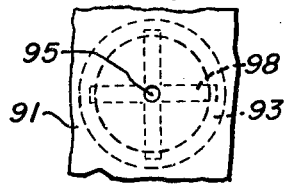
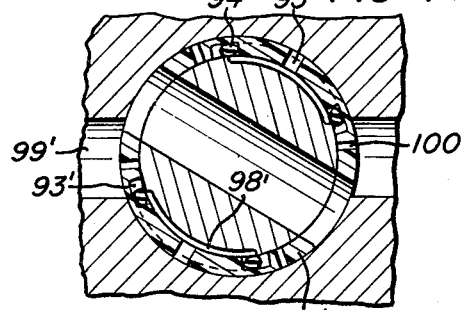
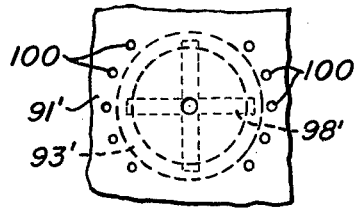
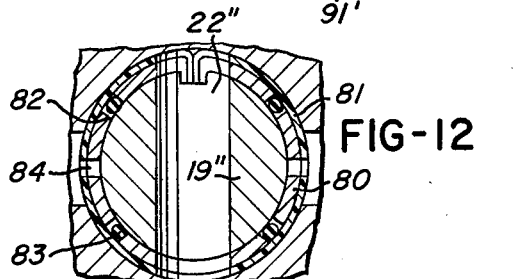
INVENTOR
WILLIAM H. SMYERS, JR.
BY Jerome P. Bloom
ATTORNEY United States Patent Office 3,497,179
Patented Feb. 24, 1970

3,497,179
VALVE
William H. Smyers, Jr., Wethersfield, Conn., assignor to Koehler-Dayton, Inc., Dayton, Ohio, a corporation of Ohio
Filed Mar. 10, 1967, Ser. No. 622,211
Int. Cl. F16k 25/00, 5/04
U.S. Cl. 251—175                                21 Claims

ABSTRACT OF THE DISCLOSURE

An improved valve unit the operating element of which per se, in its preferred form, mounts a thin flexible web of Teflon or like material which serves as a locking retainer for a seal inducing means.

---

This invention relates to improvements in valves enabling their manufacture in a simple and economical manner, yet producing a valve which is less subject to component wear and malfunction. The present valve design further avoids the inherent undesirable pressure drop which normally occurs across the lip of a valve liner in opening and closing the conventionally sealed valve unit. Other advantageous features will be obvious from the following.

For purposes of illustration the invention will be particularly described, in the main, in reference to its application to plug type valves. However, as will be indicated, by way of example, the invention application is obviously not so limited.

Though the valve art is one of long standing, it has proven difficult to produce a valve which avoids maintenance and malfunction problems. For example, the unbalanced fluid pressures to which line and plug type valves are normally subject in opening and closing inherently result in deformation and wear of their valve liners and seals and, in many cases, in an eventual jamming of and damage to their seals and main valve components.

The present invention provides a solution of the above noted problems. As distinguished from conventional valves wherein liners and seals are applied to the wall of the valve housing, embodiments of this invention are characterized by the seal means being fixed to the operating valve element per se. In the case of a plug type valve the operating valve element would be the plug. In this instance, the sealing means statically fixed to the plug include a thin flexible web unit having fixed thereunder biasing means in such a manner and form as will be further described.

A primary object of the invention is to provide an improved valve assembly which may be economically fabricated, more efficient and satisfactory in use, adaptable to a wide variety of applications and unlikely to malfunction.

A further object of the invention is to provide a valve assembly wherein the operating valve element is characterized by the embodiment of statically fixed seal means.

Another object of the invention is to provide a valve assembly wherein the operating valve element per se fixedly mounts a web-like sealing element.

An additional object of the invention is to provide a unique plug-type valve assembly which avoids the usual wear problems inherent in conventional type valves due to pressure imbalance during opening and closing procedures.

Another object of the invention is to provide valve units possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein are shown some but obviously not necessarily the only forms of embodiment of the invention, FIG. 1 is a vertical section of a plug type valve according to the present invention;

FIG. 2 is a sectional view of the valve plug taken on line 2—2 of FIG. 1;

FIG. 3 is a top view of the valve of FIG. 1;

FIG. 4 is an elevation view of the valve plug per se;

FIG. 5 shows a unique modification of the device of FIG. 1;

FIG. 6 is a diagrammatic view of a poppet valve embodying the present invention;

FIG. 7 is a similar view illustrating a gate valve;

FIG. 8 is a like view of a reciprocating plug type valve in accordance with the invention;

FIG. 9 diagrammatically illustrates the invention as applied to a ball valve;

FIG. 10 shows a modification of the ball valve of FIG. 9;

FIG. 11, 11a and 11b illustrate a further modification of the invention related to the plug type valve shown in FIGS. 1–4;

FIG. 12 shows a further plug type valve in diagrammatic cross-section illustrating a unique form of seal retention means;

FIGS. 13 and 13a illustrate a still further embodiment of the invention; and

FIGS. 14 and 14a reveal a modification of the invention embodiment of FIG. 13.

Like parts are indicated by similar characters of reference throughout the several views.

Referring to FIGS. 1–4 of the drawings, the plug type valve there shown includes a tubular body 10 of uniform internal dimension bearingly housing a rotatable plug assembly 11. The wall of body 10 is formed with a vertically centered inlet aperture 12 and a diametrically opposed outlet aperture 13. At their outermost ends the apertures 12 and 13 are respectively rimmed by tubular adapter sections 14 and 15 formed integral with and projected outwardly from the body 10. The adapter sections serve to couple the valve assembly intermediate an upstream and a downstream section of a fluid flow line. For this purpose, at its outer end the interior surface of each adapter has a slight inwardly convergent tapered portion 16 which is tapped. Inwardly of the end portion 16 the inner wall of each adapter has a smooth portion 17 of uniform diameter reducing at its inner extremity by means of a short conically convergent tapered section 18 to the diameter of the adjacent inlet or outlet aperture, 12 or 13 as the case may be.

The plug assembly 11 includes a cylindrical plug body 19 of generally uniform diameter which rotatably nests interiorly of and projects through the bore of the body 10. Adjacent its upper end, as shown in FIG. 1 of the drawings, the body 19 has a radially projected flange 20 which seats over and bears on the upper end of the body 10, a bearing washer being interposed therebetween. This flanged upper end mounts a diametrally positioned bar-like portion 21 which projects upwardly to form the operating head of the plug body.

The plug body 19 has a vertically centered transverse bore 22 which on rotation thereof in the body 10 may be coaxially aligned with the inlet and outlet apertures 12 and 13. Centered intermediate its vertical extremities the outer surface of the body 19 has a longitudinal extended circumferential recess 23 which extends equally beyond the respective vertical limits of the bore 22. The recess 23 is filled by a thin resilient flexible web 24 of a material such as Teflon. The web is suitably apertured in line with the ends of the bore 22 and statically fixed to the body 19 by index pins 25. At its inner face immediately adjacent the recessed surface of the body 19 the web 24 is formed with two circular grooves 26. The grooves 26 are centered on the ends of a diametral line of the body 19, displaced 90° from the central axis of its transverse bore 22. Each groove 26 resiliently retains an O-ring 27, held thereby in a relatively fixed position on the body 19. Centrally of each O-ring 27 the web 24 includes a small bleed aperture 28, the purpose of which shall be further described.

Spaced immediately above and below the vertical extremities of the recess 23 and within the vertical limits of the body 10, the plug body 19 has in each of these locations a ring-like recess accommodating a back up seal assembly 29. Spaced immediately below the lower end of the body 10, the body 19 further includes a circumferential notch accommodating a retainer lock ring 30 which peripherally projects to prevent the plug from being withdrawn from the body 10. Suitable bearing washer means 31 are interposed between the ring 30 and the lower end of the body 10.

The plug assembly is thus disposed in a rotatable bearing relation to the body 10 and in a vertically precise position to permit, on rotation thereof, a selective alignment of the bore 22 with the inlet and outlet apertures in the body 10.

The simplicity of the described valve construction is self-evident. However, in the effective embodiment of the web 24 and O-rings 27 significant results are obtained. In use the thin flexible web 24 has a normal bearing contact and a tendency to effect a seal with the adjacent wall of the body 10. However, in the area of the underlying rings 27 the thinned web portion is particularly biased thereby and constantly urged into a firm contact with the wall of the body 10. This insures a highly effective seal between the web and the housing 10 while the web provides an excellent bearing surface which nevertheless facilitates the smooth rotation of the plug, when such is required. When the plug is turned to close the valve, an O-ring 27 seating firmly against the body 19 rims the inlet aperture 12 and biases the overlying web portion to provide a seal thereabout against the adjacent wall of the body 10. The upstream web bleed aperture 28 simultaneously provides for the line fluid at upstream pressure to enter behind the web and exert a pressuring effect on the contained O-ring 27, in a radially outward sense. This expands and jams the ring tightly in its groove, stresses the web and emphasizes the available seal. As the valve is opened, the sealing bearing contact of the biased portion of the web is maintained. Moreover, by having the web move with the valve of the described construction, one precludes damage to the upstream seal since upstream pressure maintains the web in a firm constant engagement with the plug body. Further, with the described construction the flow through the plug bore is uninhibited by any web material about the valve openings.

As thus described, valves may be created wherein component wear and malfunction is substantially obviated.

Where the aforementioned valve construction may be subjected to very high fluid pressures, one may further increase the utility and effectiveness of the invention embodiment by a modification shown in FIG. 5 of the drawings.

Here the plug body 19 is provided on its downstream side, adjacent and spaced from the discharge end of its bore 22, with a bleed hole 32 angled to open from its outer face and through an aperture in the overlying web in following relation to the bore during closing of the valve, as by manipulation of its head portion 21. In using the valve assembly in this form one achieves a closing of the inlet 12 prior to a complete seal of the downstream end of the valve bore and further avoids any inadvertent web deflection under the uncertain conditions of a high pulsing line pressure. The manner in which this is achieved and the results thereof are believed obvious.

FIGS. 6–9 of the drawings illustrate other applications of the invention.

FIG. 6 reveals a poppet valve 34 in a fluid flow line 35. As shown, the head of the operating valve element 34 has an undercut circular recess 36. The recess 36 is filled by a disc shaped Teflon web 37 the peripheral portions of which are wedged in the undercut portion of the recess and the center of which projects therefrom. Here also a circular groove 38 is formed in the innermost face of the web. This groove accommodates and establishes an O-ring 39 in a relatively static relation to the base of the recess in the valve head. The web has a bleed aperture 40 positioned centrally of the ring.

As seen, the poppet valve is housed in an expanded portion of the flow line 35. In its closed position the valve head seats to the shoulder 41 provided by this expansion. In this case the reduced portion of the line 35 is rimmed by portions of the disc web 37 which overlie and are stressed by the contained O-ring 39 to produce a positive resilient seal to the shoulder 41 preventing leakage thereby. The effectiveness of this seal is readily obvious. The seal is enhanced by the upstream fluid which enters the aperture 40 to spread outwardly under the web, pressurize the O-ring 39 and stress the web to produce thereby an optimal seal. This seal is not in the least dependent on the inclusion in the line of any particular type or form of cooperating wall or seal element thereon. Moreover, in view of the fact the seal is effected by the underlying ring 39 which moves positively with the valve, this obviates the danger, common in conventional poppet valves, of sticking or adhering of the valve seal to its seating wall structure.

In FIG. 7 of the drawings the invention is applied to a gate type valve unit. In this case the operating valve element 50 includes a plate structure 51 slidably interposed in a housing slot to selectively open or close a fluid flow line 52. The plate structure 51 has an identical recess in each of its opposite faces respectively adapted to face upstream and downstream portions of the flow line. Each recess is filled by a thin flexible resilient web or sheet element 53 of Teflon or equivalent material which is suitably fixed to its backing plate portion 54. Adjacent the lower end of the plate structure the plate portion 54 and the overlying webs 53 have coaxial identical apertures 55, which in elevation of the gate valve are adapted to selectively open the fluid flow line 52. Above the apertures 55 the webs 53 each have their inner faces provided with a circular groove 56 accommodating a web biasing O-ring 57. Each web is provided with a bleed aperture 58 positioned centrally of its underlying O-ring. The webs, their bleed apertures and the underlying O-rings function as in the previously described embodiments.

Irrespective of the valve position, the resilient O-rings 57 maintain a resilient sealing bias of the overlying web portions to the abutting wall structure. Due to the natural resiliency thereof, however, the structure allows a smooth functioning valve operation without jamming or sticking. When the valve is in the illustrated closed position, the O-rings rim the upstream and downstream portions of the flow line and produce a positive seal of the overlying web portions to the seating wall structure thereabout. On the upstream side fluid enters the aperture 58 to expand and pressure the O-ring to function as in the previously described embodiments. Again, when the valve is in the open position the O-rings maintain the seal of the overlying web portions to abutting bearing wall structures.

FIG. 8 shows the invention applied to a reciprocating plug type valve. The structure shown here is similar to that of the gate valve of FIG. 7, differing only in that the operating plug body 51' is cylindrical and its opposite recesses are correspondingly arcuate. In this case the plug body could be molded of plastic, for example, to produce the required contour. Since the structure and function of the valve is otherwise identical with that of the gate valve, it need not be further described.

The invention can be applied just as easily to the ball valve 60 shown in FIG. 9 of the drawings. Here the flow passage 61 is intermediately expanded by a housing wall which bearingly accommodates the valve 60. Here we have a spherical valve ball formed with a circumferential diametral flange 62 and a diametral bore 62', the central axis of which lies in the plane of said flange. The ball 60 is capped to either side and to a depth slightly greater than that of the flange 62 by an appropriately contoured, generally hemi-spherical, thin resilient web 63 which is suitably indexed and fixed thereon. At diametrally opposite positions spaced 90° from either end of the bore 62, the inner surface of the webs each have a circular groove 64 accommodating a resilient O-ring 65. In the closed position of the valve shown each ring biases the overlying web portion to effect a positive resilient seal about the opening to the adjacent portion of the flow passage 61. A bleed aperture 66 in each web, which aperture is centered in reference to the underlying O-ring, functions as previously described bleed apertures when exposed to extreme pressure. Once more, on displacement from the position shown, the O-rings still function to induce pressured seals of the web structure to the housing wall.

FIG. 10 shows a modification of the ball valve illustrated in FIG. 9. In this case each corresponding web 63' is made thinner in the area within its underlying grooved portion 64'. Nesting in overlying relation to this thinned web area in each instance is an appropriately arcuate metal washer 67 centrally secured to the valve body 60' by a screw 68. The head of each screw has an axial bore 69 and an intersecting lateral bore 69 arranged, in an obvious manner, to communicate exterior fluid with the underside of the web within the surrounding O-ring 65'. The washer 67 and applied screws are arranged to avoid undue contact with the adjacent bearing wall. By this structure one achieves a secured index of the webs by means which additionally function to provide the equivalent of the bleed apertures of the aforementioned embodiments.

FIGS. 11, 11a and 11b reveal a modification of the plug assembly illustrated in FIGS. 1 to 4 of the drawings. Similar parts are here designated by similar numerals. As diagrammatically shown in cross-section, in this instance the plug body 19' has a longitudinal groove 70 running axially of one side. Moreover, as seen in FIGS. 11 and 11b, the web 24' is modified from that shown in FIGS. 1–4. The web 24' is extremely thin in all areas except for disc-like portions 72, which portions provide at the inner face thereof the diametrically opposite grooves 26' which confine O-rings 27' to the plug body in a manner and at positions previously described. Wrapped exteriorly of the web 24' is a protective retaining strip 73 of thin metal or like material. In application the strip 73 has a pair of enlarged openings 74 through which project the thicker disc shaped web portions 72 which accommodate the underlying resilient O-rings 27'. Intermediate its ends the strip 73 has an aperture 75 aligning with one end of the transverse bore 22' in the plug body 19'. The ends of the strip 73 are notched to define half portions 76 of an opening which aligns with the opposite end of the bore 22' while projected end portions 77 are wedged in the groove 70. This last provides an effective means for locking the strip 73 in place and thereby fixedly retaining the underlying web structure.

Viewing FIG. 12, here rather than using a separate metal strip and separate web as in FIG. 11, a metal strip 80 is bonded to the inner surface of a very thin Teflon strip 81. In this instance ring-like apertures 82 are cut through the inner metal strip to accommodate within the assembly resilient O-rings 83 to be confined by the strip assembly to the plug body 19" at positions displaced 90° from the ends of the transverse plug bore 22". The strip assembly is in this instance wrapped around the plug body to have projected end portions lock in an axial groove in the plug body such as described with reference to FIG. 11. Appropriate apertures are formed in strip assembly to align with the ends of the plug bore.

In this last modification the O-rings 73 are held to the surface of the plug body yet resiliently project through the metal portion of the strip assembly to engage and bias overlying strip portions and to effect seal means in an obvious manner such as previously described in reference to other embodiments. Aligned bleed apertures 84 are provided in the respective strip portions to center in reference to the O-rings 83 and insure that high pressure fluid to the upstream side of the flow line will pass therethrough when the valve plug is in a closed position. In this manner one again pressures the upstream O-ring to stress the Teflon and effect the positive seal in the manner of the invention.

FIGS. 13 and 13a reveal an invention embodiment designed to relieve particular difficult problems occasioned by high degrees of pressure drop across a valve. This is illustrated once more in a diagrammatic cross-section of an improved plug type valve generally of the nature shown in FIGS. 1–4 of the drawings. Here too the plug body 90 corresponds to the previously described plug body 19. Moreover there is provided about the body 90 a thin resilient flexible web or strip 91 of Teflon identical in construction with that of the web 24 in the first instance. In this case the web or strip 91 is fixed to the plug body by index pins. One difference does occur in the web, however, in that the circular grooves 93 which are formed in its inner surface at positions spaced 180° apart have a greater width than the previously described grooves 26 and 26'. In the circumferential application of the web the grooves 93 accommodate resilient O-rings 94 similar to the O-rings 27. Due to the fact the grooves, as shown here, are sufficiently wider than the cross-section of the O-rings to permit a greater radial movement of the rings, they enable a particular function to be further described. The web also has bleed apertures 95 centered in reference to the O-rings.

Besides the web 91 having laterally enlarged grooves permitting greater movement of the O-rings, in this case the surface of the plug underlying and within the confines of each groove 93, at positions displaced 90° from the respective ends of the plug bore 97, is milled to form shallow grooves 98. The latter grooves, in each instance, occur in the form of a cross, the extremities of the respective ends of these grooves forming the cross falling within but short of the outer diametral extremities of the overlying grooves in the webs. Thus, the ends of the grooves 98, which are arcuate in cross-section, communicate in part with the grooves 93.

The plug body 90 shown in FIG. 13 is there established in a closing position in reference to the fluid flow line 99. In such instance the upstream bleed aperture 95 receives the high pressure fluid which is readily accommodated by the shallow grooves 98 in the plug body underlying the web and channeled thereby to enter the inner portions of the upstream web groove 93. The pressure forces the expansion of the upstream O-ring 94 without any danger of seal distortion. Thus, a seal is effected as previously described and maintained on rotation of the plug to the open position. As in the instance previously described, as the upstream side of the web is appropriately pressurized to form the seal the pressure on the downstream side of the plug is relatively nominal.

As a matter of fact, the grooves 98 will function in any instance to relieve high pressure trapped in the plug assembly. Regardless of where the pressure is trapped, it can squeeze the O-ring radially inward sufficient to uncover the grooves 98 which together with grooves 93 operate to disseminate localized fluid trapped under the web and, for example, drain it downstream through the aperture 95. The valve as thus defined is reversible and in any case while the upstream seal portion becomes the metering or sealing device either seal obviates the possibility of problems due to trapped pressure such as blow out of the seal at the inner diameter of the O-ring grooves.

As an alternate construction grooves 98 could be molded in the undersurface of the web.

FIGS. 14 and 14a reveal a plug type valve as in FIG. 13 and FIG. 13a wherein the seal assembly is modified only in that small bleed holes 100 are provided in opposite sides of the web 91' in immediately adjacent relation to the outer limits of the grooves 93'. The bleed holes 100 are further safety devices in the event of unduly high pressure on the upstream side of the plug valve. The holes 100 function to prevent blow out of the web near outer diameter of the O-ring groove due to trapped pressure when moving the plug body from its open to its closed position or vice versa.

Accordingly, the embodiments of FIGS. 13 and 14 are directed to special problem situations and facilitate correcting a situation where one faces the possibility of trapped pressure in a device in accordance with the present invention.

From the preceding, it may be readily seen there is at once a unique incorporation of a sealing means in the operating element of the valve assembly and a smoother operating valve achieved thereby. The versatility of the invention has been made readily obvious as well as the economy of its application in any instance. Particular novelty and advantage also exists in providing a valve as here described wherein the upstream opening is caused to close prior to the downstream opening, noting the modification of FIG. 5 of the drawings.

While the invention has been illustrated in reference to single flow passages, it obviously is applicable in simultaneous valving of an interrelated system of passages with the operating valve element at a junction thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

Having thus described my invention, I claim:

1. A valve assembly including a valving unit for selectively opening and closing a flow passage in a wall surface comprising a movable body having fixed thereon a thin flexible impermeable web structure having a surface area exceeding the cross sectional area of said flow passage and seating against said wall surface to close said passage when aligned therewith, at least one annular seating portion of said web structure being relatively thinner than other portions, at least one resilient sealing element aligned with said thinner portion and confined thereby to said movable body, said web structure being mounted to said body to compress said sealing element and produce a reactant pressure on the said thinner portion, said sealing element affording a resilient bias to the overlying portion of the web structure to effect a positive seal in abutment thereof to the adjacent wall surface.

2. A valve assembly as in claim 1 characterized by said sealing element having a central aperture and said web structure having a bleed aperture in the portion thereof which overlies the central aperture in said sealing element.

3. A valve assembly as in claim 2 characterized by the web being grooved to accommodate said sealing element and by means defining at least one relief passage interconnecting each web grooved portion and the related bleed aperture to facilitate the flow of fluid therebetween.

4. A valve assembly as in claim 1 characterized by said sealing element having an annular shape, at least one groove formed in the inner surface of said web structure to provide said thinner portion, said sealing element conforming to and being substantially accommodated in said groove, and a bleed aperture in said web structure centrally of said groove, providing, on alignment of said sealing element with said flow passage for upstream fluid to enter and move through said bleed aperture, between said web and the adjacent surface of said movable body, to pressurize said sealing element and effect a firm seal thereby of the overlying web portions to the adjacent wall surface.

5. A valve assembly as in claim 4 characterized by portions of the surface of said movable body which lie under said web structure, within the peripheral limits of its grooved portions, being relieved to provide channel means for fluid entering the bleed aperture disposing to the upstream side of said movable body.

6. A valve assembly as in claim 4 characterized by means wrapped around portions of said web structure and connected to said movable body to statically fix said web structure in an indexed relation to said body.

7. A valve assembly as in claim 1 arranged in and to selectively open or close a flow passage characterized by said movable body having a through bore the ends of which are displaced from said sealing element, said web structure overlying said body and having openings in line with the respective ends of said bore, said web and said movable body providing means for closing the upstream portion of said flow passage prior to a closure thereby of the downstream portion of said passage.

8. A valve assembly for interposition between upstream and downstream portions of one or more flow passages including a housing forming a valving chamber having openings to communicate with upstream and downstream passage portions, a movable valving element having a through passage for selectively communicating upstream and downstream passage portions by way of said housing openings, means forming a thin flexible cover for at least a portion of said movable valving element, said cover having a surface area exceeding the cross sectional area of said openings and seating against the wall of said housing to close said openings therein when aligned therewith, resilient means under said flexible cover, said cover being fixed to said valving element and compressing thereunder said resilient means to apply a reactant bias on overlying portions of said cover to produce a sealing contact thereof with adjacent facing wall portions of said housing, said overlying portions being distinguished by greater flexing capabilities than other adjacent portions of said cover whereby to facilitate said sealing contact.

9. A valve assembly as in claim 8 characterized by the inner surface of said cover being grooved to accommodate said resilient means, said resilient means having an annular form.

10. A valve assembly as in claim 9 wherein said grooved portions are wider than the cross-section of said resilient means and said cover is apertured centrally of said resilient means whereby on centering an underlying resilient means to rim an opening in said housing communicating with an upstream passage portion, upstream fluid will enter an aperture in said cover means to move thereunder and radially pressure said rimming annular resilient means to influence overlying portions of said cover means to maintain a seal thereof to the adjacent housing wall.

11. A valve assembly as in claim 10 characterized by said grooved portions being substantially wider than said underlying resilient means and relief passages communicating said aperture receiving the upstream fluid with the rimming grooved portion of said cover, whereupon the resilient means is radially displaced in effecting and maintaining said seal.

12. A valve assembly as in claim 10 characterized by further apertures in said cover means outwardly of the grooved portions thereof.

13. A valve assembly as in claim 10 characterized by said cover means being wrapped about said valving element and having apertures aligning with the ends of said through passage and said sealing means being displaced circumferentially from said through passage.

14. A valve assembly as in claim 10 characterized by a reinforcing overlay securing said cover to said valving element, said cover being thinned in the areas underlying said overlay.

15. A valve assembly as in claim 8 characterized by a metal underlay for said cover means and said underlay being apertured to accommodate said sealing means.

16. A valve assembly according to claim 8, wherein said valving element is a rotary plug valve, said flexible cover having the character of a liner web wrapped round said plug valve and fixed thereto, said web having openings aligning with the through passage in said plug valve and said web confining said resilient means at locations in alternating spaced relation to said openings.

17. A valve assembly according to claim 16, wherein said web is formed at each of said locations with an annular groove defining a relatively thin web section, said resilient means comprising a resilient gasket received in a respective groove and compressed against the plug valve by the installation of said web upon said plug valve.

18. A valve assembly for interposition between upstream and downstream portions of one or more flow passages having incorporated therein a housing forming a valving chamber with openings to communicate upstream and downstream passage portions, a movable valving element having a through passage for selectively communicating upstream and downstream passage portions by way of said housing openings, said valving element per se incorporating resilient sealing means and a flexible cover thereover which are movable therewith, portions of said cover which overlie said sealing means being formed to have greater flexing capabilities than other adjacent portions and being retained to said valving element to produce a reactant pressure from said underlying resilient means to facilitate a seal of an opening to a flow passage on alignment therewith.

19. A plug type valve assembly, including a valve housing having a central longitudinal bore therein and a plurality of radially disposed fluid flow openings communicating with said bore, a plug valve having a transverse through bore to be selectively aligned with to interconnect fluid flow openings, said valve being received in said housing bore for relative rotary positioning, a circumferential groove in said plug valve, a flexible liner web having at each of a pair of spaced locations thereon an annular groove, said web being releasably wrapped around said plug valve in said valve groove, said web being oriented to face its grooves inwardly upon the surface of said plug valve, and a resilient gasket in each of said annular grooves compressed against the plug valve by installation of said web and reacting against the bottom of its groove, the web section defining said bottom being thin to be biased by the reactant pressure of said gasket into sealing contact with the wall of said housing bore, an annulus so defined by the biased wall section exceeding in diameter said radial openings so that in an angular position of adjustment of said plug valve aligning said grooves with opposed radial openings said openings are surrounded and sealed by said biased wall sections.

20. A plug type valve assembly according to claim 19, characterized by an aperture in said web centrally of each annular groove therein and by relief means in said plug valve underlying said web communicating said aperture with the surrounding annular groove.

21. A plug type valve assembly according to claim 19, wherein said annular grooves in said web are formed in longitudinally spaced portions of greater thickness than the balance of the web, characterized by a retaining strip in encircling relation to said web and having a pair of enlarged openings through which the relatively thick portions of said web project, said web and said strip having through openings aligning with one another and with the transverse through passage in said plug valve.

References Cited

UNITED STATES PATENTS

| 3,103,948 | 9/1963 | Salmen | 251—317 X |
| 3,130,952 | 4/1964 | Meyer | 251—175 |

FOREIGN PATENTS

| 870,403 | 12/1941 | France. |

ROBERT W. MICHELL, Primary Examiner

U.S. Cl. X.R.

251—317